US007013976B2

(12) United States Patent
Nguyen et al.

(10) Patent No.: US 7,013,976 B2
(45) Date of Patent: Mar. 21, 2006

(54) COMPOSITIONS AND METHODS FOR CONSOLIDATING UNCONSOLIDATED SUBTERRANEAN FORMATIONS

(75) Inventors: Philip D. Nguyen, Duncan, OK (US); Johnny A. Barton, Marlow, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 57 days.

(21) Appl. No.: 10/603,492

(22) Filed: Jun. 25, 2003

(65) Prior Publication Data

US 2004/0261997 A1 Dec. 30, 2004

(51) Int. Cl.
*E21B 33/13* (2006.01)
(52) U.S. Cl. .................................... 166/295; 507/220
(58) Field of Classification Search ................ 166/281, 166/295, 280.2; 507/234, 220; 523/131
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Schneider .................. 260/78.3 |
| 2,869,642 A | 1/1959 | McKay et al. | |
| 3,047,067 A | 7/1962 | Williams et al. .............. 166/33 |
| 3,123,138 A | 3/1964 | Robichaux ................... 166/33 |
| 3,176,768 A | 4/1965 | Brandt et al. ................. 166/33 |
| 3,199,590 A | 8/1965 | Young .......................... 166/33 |
| 3,272,650 A | 9/1966 | MacVittie ...................... 134/7 |
| 3,297,086 A | 1/1967 | Spain .......................... 166/33 |
| 3,308,885 A | 3/1967 | Sandiford ..................... 166/33 |
| 3,316,965 A | 5/1967 | Watanabe ..................... 166/33 |
| 3,375,872 A | 4/1968 | McLaughlin et al. .......... 166/29 |
| 3,404,735 A | 10/1968 | Young et al. .................. 166/33 |
| 3,415,320 A * | 12/1968 | Young ......................... 166/294 |
| 3,492,147 A | 1/1970 | Young et al. ............... 117/62.2 |
| 3,659,651 A | 5/1972 | Graham ...................... 166/280 |
| 3,681,287 A | 8/1972 | Brown et al. ................. 260/67 |
| 3,754,598 A | 8/1973 | Holloway, Jr. .............. 166/249 |
| 3,765,804 A | 10/1973 | Brandon ...................... 417/540 |
| 3,768,564 A | 10/1973 | Knox et al. .................. 166/307 |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |
| 3,842,911 A | 10/1974 | Know et al. ................ 166/307 |
| 3,854,533 A | 12/1974 | Gurley et al. ............... 166/276 |
| 3,863,709 A | 2/1975 | Fitch ............................. 165/1 |
| 3,868,998 A | 3/1975 | Lybarget et al. ............ 166/278 |
| 3,888,311 A | 6/1975 | Cooke, Jr. ................... 166/280 |
| 3,912,692 A | 10/1975 | Casey et al. ................ 260/78.3 |
| 3,948,672 A | 4/1976 | Harnsberger ................. 106/90 |
| 3,955,993 A | 5/1976 | Curtice ......................... 106/90 |
| 3,960,736 A | 6/1976 | Free et al. ................ 252/8.55 R |
| 4,008,763 A | 2/1977 | Lowe et al. ................. 166/253 |
| 4,029,148 A | 6/1977 | Emery ....................... 166/250.1 |
| 4,031,958 A | 6/1977 | Sandiford et al. ........... 166/270 |
| 4,042,032 A | 8/1977 | Anderson et al. ........... 166/276 |
| 4,070,865 A | 1/1978 | McLaughlin .................... 61/36 |
| 4,074,760 A | 2/1978 | Copeland et al. ........... 166/276 |
| 4,169,798 A | 10/1979 | DeMartino ............. 252/8.55 R |
| 4,172,066 A | 10/1979 | Zweigle et al. ........ 260/29.6 TA |
| 4,245,702 A | 1/1981 | Haafkens et al. ............ 166/307 |
| 4,273,187 A | 6/1981 | Satter et al. ................ 166/250 |
| 4,305,463 A | 12/1981 | Zakiewicz ................... 106/245 |
| 4,336,842 A | 6/1982 | Graham et al. ............. 166/276 |
| 4,352,674 A | 10/1982 | Fery ............................. 23/230 |
| 4,353,806 A | 10/1982 | Canter et al. ................ 507/229 |
| 4,387,769 A | 6/1983 | Erbstoesser et al. ........ 166/295 |
| 4,415,805 A | 11/1983 | Fertl et al. ................... 250/260 |
| 4,439,489 A | 3/1984 | Johnson et al. ............. 428/404 |
| 4,443,347 A | 4/1984 | Underdown et al. ... 252/8.55 R |
| 4,460,052 A | 7/1984 | Gockel ........................ 175/72 |
| 4,470,915 A | 9/1984 | Conway ................ 252/8.55 R |
| 4,493,875 A | 1/1985 | Beck et al. ................. 428/403 |
| 4,494,605 A | 1/1985 | Wiechel et al. ............. 166/288 |
| 4,498,995 A | 2/1985 | Gockel .................... 252/8.5 LC |
| 4,501,328 A | 2/1985 | Nichols ....................... 166/288 |
| 4,526,695 A | 7/1985 | Erbstosser et al. ..... 252/8.55 R |
| 4,527,627 A | 7/1985 | Graham et al. ............. 166/280 |
| 4,541,489 A | 9/1985 | Wu ............................. 166/312 |
| 4,546,012 A | 10/1985 | Brooks ....................... 427/213 |
| 4,553,596 A | 11/1985 | Graham et al. ............. 166/295 |
| 4,564,459 A | 1/1986 | Underdown et al. ... 252/8.55 R |
| 4,572,803 A | 2/1986 | Yamazoe et al. ............. 534/16 |
| 4,649,998 A | 3/1987 | Friedman .................... 166/294 |
| 4,664,819 A | 5/1987 | Glaze et al. ............. 252/8.551 |
| 4,665,988 A | 5/1987 | Murphey et al. ........... 166/295 |
| 4,669,543 A | 6/1987 | Young ........................ 166/276 |
| 4,675,140 A | 6/1987 | Sparks et al. ................ 264/4.3 |

(Continued)

FOREIGN PATENT DOCUMENTS

CA    2063877    5/2003

(Continued)

OTHER PUBLICATIONS

Foreign Search Report and Opinion (PCT/GB2004/002727), Mar. 11, 2005.

(Continued)

*Primary Examiner*—William P Neuder
(74) *Attorney, Agent, or Firm*—Robert A. Kent; Baker Botts

(57) ABSTRACT

The present invention described a resin composition comprising from about 5% to about 30% phenol, from about 40% to about 70% phenol formaldehyde, from about 10% to about 40% furfuryl alcohol, from about 0.1% to about 3% of a silane coupling agent, and from about 1% to about 15% of a surfactant and methods of using of that resin in consolidating subterranean formation fines.

19 Claims, No Drawings

U.S. PATENT DOCUMENTS

| | | | |
|---|---|---|---|
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/276 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 166/280.2 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |

| Patent | Date | Inventor | Class |
|---|---|---|---|
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacob et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B1 | 12/2001 | Chatterji et al. | 166/295 |
| 6,350,309 B1 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B1 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B1 | 12/2002 | Brothers et al. | 106/692 |
| 6,494,263 B1 | 12/2002 | Todd | 166/312 |
| 6,503,870 B1 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,552,333 B1 | 4/2003 | Storm et al. | 250/269.3 |
| 6,554,071 B1 | 4/2003 | Reddy et al. | 166/293 |
| 6,555,507 B1 | 4/2003 | Chatterji et al. | 507/219 |
| 6,569,814 B1 | 5/2003 | Brady et al. | 507/201 |
| 6,582,819 B1 | 6/2003 | McDaniel et al. | 428/402 |
| 6,593,402 B1 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |

| | | | | |
|---|---|---|---|---|
| 6,732,800 B1 | 5/2004 | Acock et al. ............... 166/308 | GB | 2382143 A | 4/2001 |
| 6,745,159 B1 | 6/2004 | Todd et al. .................... 703/10 | WO | WO 93/15127 | 8/1993 |
| 6,749,025 B1 | 6/2004 | Brannon et al. ......... 166/305.1 | WO | WO 94/07949 | 4/1994 |
| 6,763,888 B1 | 7/2004 | Harris et al. ............. 166/305.1 | WO | WO 94/08078 | 4/1994 |
| 6,766,858 B1 | 7/2004 | Nguyen et al. ............. 166/300 | WO | WO 94/08090 | 4/1994 |
| 6,776,236 B1 | 8/2004 | Nguyen ...................... 166/279 | WO | WO 95/09879 | 4/1995 |
| 6,832,650 B1 | 12/2004 | Nguyen et al. ............. 166/279 | WO | WO 97/11845 | 4/1997 |
| 6,851,474 B1 | 2/2005 | Nguyen ...................... 166/279 | WO | WO 99/27229 | 6/1999 |
| 6,887,834 B1 | 5/2005 | Nguyen et al. ............. 507/221 | WO | WO 01/81914 | 11/2001 |
| 2001/0016562 A1 | 8/2001 | Muir et al. .................. 507/201 | WO | WO 01/87797 A1 | 11/2001 |
| 2002/0043370 A1 | 4/2002 | Poe ....................... 166/250.07 | WO | WO 02/12674 A1 | 2/2002 |
| 2002/0048676 A1 | 4/2002 | McDaniel et al. .......... 428/404 | WO | WO 03/027431 A1 | 4/2003 |
| 2003/0006036 A1 | 1/2003 | Malone et al. ......... 166/250.12 | WO | WO 04/037946 A1 | 5/2004 |
| 2003/0060374 A1 | 3/2003 | Cooke, Jr. .................... 507/200 | WO | WO 04/038176 A1 | 5/2004 |
| 2003/0114314 A1 | 6/2003 | Ballard et al. .............. 507/100 | WO | WO 05/021928 A2 | 3/2005 |
| 2003/0130133 A1 | 7/2003 | Vollmer ...................... 507/100 | | | |
| 2003/0131999 A1 | 7/2003 | Nguyen et al. ............. 166/280 | | | |
| 2003/0148893 A1 | 8/2003 | Lungofer et al. ........... 507/200 | | | |
| 2003/0186820 A1 | 10/2003 | Thesing ...................... 507/200 | | | |
| 2003/0188766 A1 | 10/2003 | Banerjee et al. ................ 134/7 | | | |
| 2003/0188872 A1 | 10/2003 | Nguyen et al. ............. 166/308 | | | |
| 2003/0196805 A1 | 10/2003 | Boney et al. ............... 166/280 | | | |
| 2003/0205376 A1 | 11/2003 | Ayoub et al. ............. 166/254.2 | | | |
| 2003/0230408 A1 | 12/2003 | Acock et al. ............... 166/297 | | | |
| 2003/0234103 A1 | 12/2003 | Lee et al. .................... 166/293 | | | |
| 2004/0000402 A1 | 1/2004 | Nguyen et al. ............. 166/280 | | | |
| 2004/0014607 A1 | 1/2004 | Sinclair et al. .............. 507/200 | | | |
| 2004/0014608 A1 | 1/2004 | Nguyen et al. ............. 507/200 | | | |
| 2004/0040706 A1 | 3/2004 | Hossaini et al. ............ 166/278 | | | |
| 2004/0040708 A1 | 3/2004 | Stephenson et al. ..... 166/280.1 | | | |
| 2004/0040713 A1 | 3/2004 | Nguyen et al. ............. 166/295 | | | |
| 2004/0048752 A1 | 3/2004 | Nguyen et al. ............. 507/269 | | | |
| 2004/0055747 A1 | 3/2004 | Lee ............................. 166/278 | | | |
| 2004/0106525 A1 | 6/2004 | Willbert et al. ............. 507/200 | | | |
| 2004/0138068 A1 | 7/2004 | Rimmer et al. ............. 507/100 | | | |
| 2004/0149441 A1 | 8/2004 | Nguyen et al. ........... 166/280.1 | | | |
| 2004/0152601 A1 | 8/2004 | Still et al. .................... 507/100 | | | |
| 2004/0177961 A1 | 9/2004 | Nguyen et al. ........... 166/280.2 | | | |
| 2004/0194961 A1 | 10/2004 | Nguyen et al. ............. 166/295 | | | |
| 2004/0206499 A1 | 10/2004 | Nguyen et al. ........... 166/280.2 | | | |
| 2004/0211559 A1 * | 10/2004 | Nguyen et al. ............. 166/276 | | | |
| 2004/0211561 A1 | 10/2004 | Nguyen et al. ........... 166/280.2 | | | |
| 2004/0221992 A1 | 11/2004 | Nguyen et al. ............. 166/295 | | | |
| 2004/0231845 A1 | 11/2004 | Cooke, Jr. .................. 166/279 | | | |
| 2004/0231847 A1 | 11/2004 | Nguyen et al. ............. 166/295 | | | |
| 2004/0256099 A1 | 12/2004 | Nguyen et al. ............. 166/249 | | | |
| 2004/0261995 A1 | 12/2004 | Nguyen et al. ............. 166/279 | | | |
| 2004/0261997 A1 | 12/2004 | Nguyen et al. ............. 166/281 | | | |
| 2005/0000731 A1 | 1/2005 | Nguyen et al. ............... 175/57 | | | |
| 2005/0006093 A1 | 1/2005 | Nguyen et al. ............. 166/281 | | | |
| 2005/0006096 A1 | 1/2005 | Nguyen et al. ............. 166/295 | | | |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0 864 726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |

OTHER PUBLICATIONS

S. W. Almond, et al., "*Factors Affecting Proppant Flowback with Resin Coated Proppants*," Society of Petroleum Engineers, Inc., SPE 30096, p. 171-186, 1995.
U.S. Appl. No. 10/383,154, filed Mar. 6, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.

Halliburton, *CoalStim<sup>SM</sup> Service, Helps Boost Cash Flow From CBM Assets*, Stimulation, HO3679 Oct. 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages.

Halliburton *"CobraFrac<sup>SM</sup> Service, Coiled Tubing Fracturing—Cost-Effective Method for Stimulating Untapped Reserves"*, 2 pages, 2004.

Halliburton *"CobraJetFrac<sup>SM</sup> Service, Cost-Effective Technology That Can Help Reduce Cost per BOE Produced, Shorten Cycle time and Reduce Capex"*.

Halliburton Cobra Frac Advertisement, 2001.

Halliburton *"SurgiFrac<sup>SM</sup> Service, a Quick and cost-Effective Method to Help Boost Production From Openhole Horizonal Completions"*, 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation By Pressure Pulse"*, SPE 63035, 2000.

Nguyen et al., *New Guidelines for Applying Curable Resin-Coated Proppants*, SPE Paper No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Charactrerization of Substituted Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch. 12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective In Level 1 Dual-Lateral Completion"* SPE 78697, 2002.

Albertsson et al.,*"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid For High-Temperature Applications"*, SPE 80236, 2003.

*Chelating Agents*, Encyclopedia of Chemical Technology, vol. 5 (764-795).

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp 1-2.

CDX Gas, *"What is Coalbed Methane?"* CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled ""INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

\* cited by examiner

COMPOSITIONS AND METHODS FOR CONSOLIDATING UNCONSOLIDATED SUBTERRANEAN FORMATIONS

BACKGROUND OF THE INVENTION

1. Field of the Invention

The present invention relates to consolidating unconsolidated subterranean formations. More particularly, the present invention relates to improved resin compositions and their use in consolidating unconsolidated subterranean formations to prevent the production of particulates along with formation fluids.

2. Description of the Prior Art

Hydrocarbon wells are often located in subterranean zones that contain unconsolidated particulate matter that can migrate out with oil, gas, water, and/or other fluids produced by the wells. The presence of particulate matter, such as sand, in produced fluids is disadvantageous and undesirable in that the particulates may abrade pumping and other producing equipment and reduce the fluid production capabilities of the producing zones. Unconsolidated subterranean zones include those which contain loose particulates that are readily entrained by produced fluids and those wherein the particulates making up the zone are bonded together with insufficient bond strength to withstand the forces produced by the production of fluids through the zones.

One method of controlling loose sands in unconsolidated formations involves placing a filtration bed of gravel near the wellbore in order to present a physical barrier to the transport of unconsolidated formation fines with the production of hydrocarbons. Typically, such so-called "gravel packing operations" involve the pumping and placement of a quantity of a desired particulate into the unconsolidated formation adjacent to the wellbore. Such packs may be time consuming and expensive to install.

Another method used to control loose sands in unconsolidated formations involves consolidating unconsolidated subterranean producing zones into hard permeable masses by (1) pre-flushing the formation, (2) applying a hardenable resin composition, (3) applying a spacer fluid, and (4) applying an after-flush fluid containing an external catalyst activation agent to remove excess resin from the pore spaces of the formation sand and to cause the resin to set. Such multiple-component applications, however, often result in uncertainty and create a risk for undesirable results. For example, when an insufficient amount of spacer fluid is used between the application of the hardenable resin and the application of the external catalyst, the resin may come into contact with the external catalyst in the wellbore itself rather than in the unconsolidated subterranean producing zone. This may be very problematic. When resin is contacted with an external catalyst an exothermic reaction occurs that may result in rapid polymerization. The polymerization may damage the formation by plugging the pore channels, may halt pumping when the wellbore is plugged with solid material, or may even result in a down hole explosion as a result of the heat of polymerization. Also, using these conventional processes to treat long intervals of unconsolidated regions may not be practical due to the difficulty in determining if the entire interval that has been treated with both the resin and the activation agent.

Another problem encountered in the use of hardenable resin compositions is that the resins have heretofore had very short shelf lives. The shelf lives of some resins once mixed have been as short as about four hours or less. Such a short-shelf life can lead to costly waste if the operation using the resin is postponed after the resin is mixed.

SUMMARY OF THE INVENTION

The present invention relates to consolidating unconsolidated subterranean formations. More particularly, the present invention relates to improved resin compositions and their use in consolidating unconsolidated subterranean formations to prevent the production of particulates along with formation fluids. The compositions and methods of the present invention involve resin compositions capable of hardening and consolidating unconsolidated subterranean regions, and substantially preventing the production of unconsolidated subterranean particles such as formation sands and fines.

One embodiment of the present invention describes a resin composition comprising from about 5% to about 30% phenol, from about 40% to about 70% phenol formaldehyde, from about 10% to about 40% furfuryl alcohol, from about 0.1% to about 3% of a silane coupling agent, from about 1% to about 15% of a surfactant, and a solvent.

Another embodiment of the present invention describes a method of consolidating particulates in a subterranean region comprising the steps of applying a preflush fluid to the subterranean region, applying a resin as described above to the subterranean region, and applying an after-flush fluid to the subterranean region.

The objects, features and advantages of the present invention will be readily apparent to those skilled in the art upon a reading of the description of preferred embodiments that follows.

DESCRIPTION OF PREFERRED EMBODIMENTS

The present invention provides improved resin compositions and methods of using the improved resins to control the production of particulates, such as formation sands and fines, along with produced formation fluids.

The improved resin compositions of the present invention comprise phenol, phenol formaldehyde, furfuryl alcohol, a silane coupling agent, a surfactant, and an optional solvent. The resin compositions of the present invention may be useful in a variety of subterranean conditions but are particularly well-suited for use in subterranean formations exhibiting temperatures above about 200° F. The resins of the present invention do not begin to cure until they are exposed to temperatures above about 175° F. Thus, the resins of the present invention can be prepared and then stored for long periods of time at temperatures below about 175° F. without concern that the resin compositions will become unusable over time.

The resin compositions of the present invention may be used to consolidate unconsolidated subterranean formation sands. When used for that purpose, the resin viscosity should preferably be controlled to ensure that it is able to sufficiently penetrate the unconsolidated portions of the subterranean formation. For example, where the subterranean formation being consolidated is a formation surrounding a wellbore, from about 1 to about 3 feet of penetration into the formation from the wellbore may be desired. Where the subterranean formation being consolidated is a formation wall adjacent to a propped fracture, for example, from about 0.25 to about 2 inches of penetration into the fracture wall is generally sufficient. To achieve the desired level of penetration, the consolidation fluid viscosity is preferably below 100 cP, more preferably below 40 cP, and most preferably below 10 cP. Achieving the desired viscosity will generally dictate a resin to solvent ratio ranging from about 1:0.2 to about 1:20. It is within the ability of one skilled in the art with the benefit of this disclosure to use a sufficient amount of a suitable solvent to achieve the desired viscosity and, thus, to achieve the preferred penetration into the subterranean formation.

One embodiment of the methods of the present invention for stabilizing a subterranean formation comprises the steps of applying a preflush solution to the unconsolidated subterranean formation, applying the resin composition of the present invention to the unconsolidated subterranean formation, applying an after-flush fluid to the unconsolidated subterranean formation to, inter alia, remove excess consolidation fluid from the pore spaces and the wellbore, and then allowing time for the resin composition to substantially cure.

Preflush fluids suitable for use in the methods of the present invention comprise a combination of an aqueous liquid and a surfactant. The pre-flush fluid, inter alia, readies the formation to receive the consolidation fluid and removes oils that may impede the consolidation fluid from making contact with the formation sands. The aqueous liquid may be fresh water, salt water, brine or any other aqueous liquid that does not adversely react with the other components utilized in accordance with this invention. Any surfactant compatible with the aqueous liquid and capable of aiding the curable resin in coating the surface of unconsolidated particles of the subterranean formation may be suitable for use in the present invention. Suitable surfactants include, but are not limited to, ethoxylated nonyl phenol phosphate esters, cationic surfactants, non-ionic surfactants, alkyl phosphonate surfactant, or combinations thereof. The mixtures of one or more cationic and nonionic surfactants are suitable and examples are described in U.S. Pat. No. 6,311,773 issued to Todd et al. on Nov. 6, 2001, the disclosure of which is incorporated herein by reference. A $C_{12}$–$C_{22}$ alkyl phosphonate surfactant is preferred.

As described above, the resin compositions of the present invention comprise phenol, phenol formaldehyde, furfuryl alcohol, a silane coupling agent, a surfactant, and an optional solvent.

Phenol is a commercially available, hydroxy benzene derivative, aromatic alcohol that exhibits weak acidic properties and contains a hydroxyl group attached to a benzene ring. The resins of the present invention comprise from about 5% to about 30% phenol by weight of the overall resin composition.

Phenol formaldehyde is a commercially available synthetic polymer made from phenol and formaldehyde monomers. The resins of the present invention comprise from about 40% to about 70% phenol formaldehyde by weight of the overall resin composition.

Furfuryl alcohol is a primary alcohol and an oligomer of furan resin that is colorless or pale yellow in appearance. In the resins of the present invention, the furfuryl alcohol polymerizes from an oligomer form into a stable furan resin polymer. The resins of the present invention comprise from about 10% to about 40% furfuryl alcohol by weight of the overall resin composition.

Silane coupling agents are chemicals that contain silicone at the center of the silane molecule that is chemically attached to a first functional group such as vinyl, amino, chloro, epoxy, mercapto, and a second functional group such as methoxy or ethoxy. Silane coupling agents act, inter alia, such that the first functional group may attach to an organic compound while the second functional group may attach to an inorganic material or substrate to achieve a "coupling" effect. Any silane coupling agent that is compatible with the hardening agent and facilitates the coupling of the resin to the surface of the formation sand particles is suitable for use in the present invention. Examples of preferred silane coupling agents suitable for use in the present invention include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof. The silane coupling agent used is included in the resin in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the other components of the resin composition may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,773, issued to Todd et al. on Nov. 6, 2001, which is incorporated herein by reference. A $C_{12}$–$C_{22}$ alkyl phosphonate surfactant is preferred. The surfactant or surfactants utilized are included in the liquid hardening agent component in an amount in the range of from about 1% to about 15% by weight of the liquid hardening agent component.

Any solvent that is compatible with the resin and achieves the desired viscosity effect is suitable for use in the present invention. Solvents may be used to reduce the viscosity of the resin compositions for ease of handling, mixing, and transferring the resin composition. Preferred solvents are those having high flash points (most preferably about 125° F.) because of, inter alia, environmental factors. As described above, use of a solvent in the resin composition is optional but may be desirable to reduce the viscosity of the resin composition. It is within the ability of one skilled in the art with the benefit of this disclosure to determine if and how much solvent is needed to achieve a suitable viscosity. Solvents suitable for use in the present invention include, but are not limited to, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, gamma-butyrolactone, butylene carbonate, propylene carbonate, ethylene carbonate, methanol, butyl alcohol, d'limonene, fatty acid methyl esters, and combinations thereof. The amount of the solvent utilized in the resin composition is generally in the range of from about 0% to about 300% by weight of the resin composition.

The after-flush may be an aqueous liquid or an inert gas. Where the after-flush fluid is an aqueous liquid, it may be fresh water, salt water, brine, viscosified water, or any other aqueous liquid that does not adversely react with the other components utilized in accordance with this invention. Where an aqueous after-flush fluid is used, a volume of about 1 to about 5 times the volume of the consolidation fluid used is generally suitable. In some subterranean formations, particularly gas-producing subterranean formations, it may be advantageous to after-flush using an, inert gas, such as nitrogen, rather than an aqueous solution to prevent interaction between the after-flush fluid and the formation. The after-flush fluid acts, inter alia, to displace the curable resin from the wellbore, to remove curable resin from the pore spaces inside the subterranean formation thereby restoring permeability and leaving behind some resin at the contact points between formation sand particulate to form a permeable, consolidated formation sand pack.

The chosen period of time needed for the resin to substantially cure will depend on the consolidation fluid used, the temperature of the formation, and the unconfined compressive strength needed in the particular application. Generally, the chosen period of time will be between about 0.5 hours and about 72 hours, preferably between about 6 hours and about 48 hours. Determining the proper cure time is within the ability of one skilled in the art with the benefit of this disclosure.

To facilitate a better understanding of the present invention, the following examples of some of the preferred embodiments are given. In no way should such examples be read to limit the scope of the invention.

EXAMPLES

Example 1

Unconsolidated formation sand packs were simulated by preparing a mixture of 70/170-mesh sand (88% by weight) with silica flour (12% by weight). This sand mixture was tightly packed into a cylinder brass chamber having a diameter of 2.38 cm. The sand pack was sandwiched between two sand packs of 20/40-mesh sand, each with a thickness of 1.25 cm. A 80-mesh stainless wire-mesh screen was also installed at the bottom of the sand pack. The overall length of the sand pack was 9.85 cm. A low viscosity phenolic-furan resin of the present invention was prepared by mixing 9.5 mL of phenol, 78 mL of phenol formaldehyde, and 32.5 mL of furfuryl alcohol, 180 cc of 2-butoxy ethanol, 3 cc of n-beta-(aminoethyl)-gamma-aminopropyl trimethoxysilane, and 15 cc of an alkyl phosphonate surfactant.

The treatment procedure involved injecting the sand pack with 100 cc of preflush which comprised of 5% NH$_4$Cl and 1% alkyl phosphonate surfactant, injecting 100 cc of low viscosity phenolic-furan resin mixture, and injecting 200 cc of afterflush which is the same as that of the preflush. The resin-treated sand pack was then sealed to prevent leaking or evaporation during curing and was placed in oven for curing at 275° F. for 40 hours. After curing, consolidated cores were obtained for unconfined compressive strength measurements. The unconfined compressive strengths are ranging between 450 psi to 975 psi.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of consolidating particulates in a subterranean region comprising the steps of:
    applying a preflush fluid to the subterranean region;
    applying a resin composition to the subterranean region wherein the resin comprises:
        from about 5% to about 30% phenol by weight of the resin composition;
        from about 40% to about 70% phenol formaldehyde by weight of the resin composition;
        from about 10% to about 40% furfuryl alcohol by weight of the resin composition;
        from about 0.1% to about 3% of a silane coupling agent by weight of the resin composition; and,
        from about 1% to about 15% of a surfactant by weight of the resin composition; and,
    applying an after-flush fluid to the subterranean region.

2. The method of claim 1 wherein the unconsolidated region is an area surrounding a wellbore.

3. The method of claim 2 wherein the resin is applied such that the area surrounding the wellbore is saturated to a depth from about 1 to about 3 feet.

4. The method of claim 1 wherein the unconsolidated region is an area surrounding a fracture.

5. The method of claim 4 wherein the resin is applied such that the area surrounding the fracture is saturated to a depth is from about 0.25 to about 2 inches.

6. The method of claim 1 wherein the preflush fluid comprises an aqueous liquid and a surfactant.

7. The method of claim 6 wherein the aqueous liquid is selected from the group consisting of fresh water, salt water, brine, and mixtures thereof.

8. The method of claim 6 wherein the surfactant is selected from the group consisting of ethoxylated nonyl phenol phosphate ester, cationic surfactants, non-ionic surfactants, alkyl phosphonate surfactants, and combinations thereof.

9. The method of claim 1 wherein the silane coupling agent is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof.

10. The method of claim 1 wherein the surfactant is selected from the groups consisting of ethoxylated nonyl phenol phosphate ester, cationic surfactants, non-ionic surfactants, alkyl phosphonate surfactants, and combinations thereof.

11. The method of claim 1 wherein the resin composition has a viscosity of below 100 cP.

12. The method of claim 1 wherein the resin composition further comprises a solvent.

13. The method of claim 12 wherein the solvent is selected from the group of 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, gamma-butyrolactone, butylene carbonate, propylene carbonate, ethylene carbonate, methanol, butyl alcohol, d-limonene, fatty acid methyl esters, and combinations thereof.

14. The method of claim 1 wherein the preflush solution comprises an aqueous liquid selected from the group consisting of fresh water, salt water, brine, and mixtures thereof.

15. The method of claim 1 wherein the preflush solution comprises a surfactant selected from the group consisting ethoxylated nonyl phenol phosphate ester, cationic surfactants, non-ionic surfactants, alkyl phosphonate surfactants, and mixtures thereof.

16. The method of claim 1 wherein the after-flush fluid comprises an aqueous liquid selected from the group consisting of fresh water, salt water, brine, and mixtures thereof.

17. The method of claim 1 wherein the after-flush fluid comprises nitrogen.

18. The method of claim 1 further comprising the step of, after applying the after-flush fluid, waiting a chosen period of time.

19. The method of claim 18 wherein the chosen period of time is from about 6 to about 48 hours.

* * * * *